United States Patent [19]
Bair et al.

[11] Patent Number: 5,999,924
[45] Date of Patent: *Dec. 7, 1999

[54] METHOD AND APPARATUS FOR PRODUCING SEQUENCED QUERIES

[75] Inventors: John Bair, Superior, Colo.; Richard T Snodgrass, Tucson, Ariz.

[73] Assignee: Amazon.com, Inc., Seattle, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/900,181

[22] Filed: Jul. 25, 1997

[51] Int. Cl.$^6$ ....................................................... G06F 17/30
[52] U.S. Cl. ............................. 707/4; 707/2; 707/3; 707/5
[58] Field of Search ..................................... 707/3, 4, 5, 2

[56] References Cited

U.S. PATENT DOCUMENTS

| | | | |
|---|---|---|---|
| 4,748,439 | 5/1988 | Robinson et al. | 340/146.2 |
| 4,924,435 | 5/1990 | Brunvand et al. | 711/110 |
| 4,956,774 | 9/1990 | Shibamiya et al. | 364/200 |
| 5,265,065 | 11/1993 | Turtle | 707/4 |
| 5,418,948 | 5/1995 | Turtle | 707/4 |
| 5,440,730 | 8/1995 | Elmasri et al. | 707/203 |
| 5,495,606 | 2/1996 | Borden et al. | 707/4 |
| 5,574,900 | 11/1996 | Huang et al. | 707/1 |
| 5,600,831 | 2/1997 | Levy et al. | 707/2 |
| 5,706,495 | 1/1998 | Chadha et al. | 707/2 |
| 5,710,916 | 1/1998 | Barbara et al. | 707/9 |
| 5,745,899 | 4/1998 | Burrows | 707/102 |

FOREIGN PATENT DOCUMENTS

| | | | |
|---|---|---|---|
| 0855656 A2 | 7/1998 | European Pat. Off. | G06F 17/00 |

OTHER PUBLICATIONS

Elmasri, ramez et al., "Partitioning of Time Index for Optical Disks" 1992 IEEE pp. 574–583, Jul. 1992.

Schikuta, Erich et al., "A Knowledge Base for the Optimization of Parallel Query Execution Plan", 1997 IEEE pp. 331–337, Sep. 1997.

Wu, Chao–Hui et al., "Querying Multimedia Presentations" 1997 IEEE pp. 64–73, Jun. 1997.

*Primary Examiner*—Paul R. Lintz
*Assistant Examiner*—Shahid Alam
*Attorney, Agent, or Firm*—Charles E. Gotleib

[57] ABSTRACT

A method and apparatus converts an original query into a sequenced query that takes into account a range of values of a variable defined by a start and end point in performing the query. The start or end points are calculated if necessary and a query to collect all of the start and end points may be generated, and a query is generated that produces a constant set of start and end points defining consecutive periods, such that all the data in the tables related to the original query is constant over each of these periods. These two queries are merged into the original query to produce a sequenced query capable of execution on various database software and capable of taking into account the range of values of the variable in performing the original query.

30 Claims, 4 Drawing Sheets

100 ↘

| NAME | SALARY | MANAGER |
|---|---|---|
| BOB | 20 | TOM | ← 110
| TOM | 25 | ED | ← 112

| NAME | SALARY | MANAGER | STARTDATE | STOPDATE |
|---|---|---|---|---|
| BOB | 10 | TOM | 1992-01-01 | 1994-02-10 | ← 160
| BOB | 20 | TOM | 1994-03-01 | 1996-01-01 | ← 162
| TOM | 15 | ED | 1992-01-01 | 1995-09-01 | ← 164
| TOM | 25 | ED | 1995-09-01 | 1996-07-01 | ← 166

METHOD AND APPARATUS FOR PRODUCING SEQUENCED QUERIES

FIELD OF THE INVENTION

The present invention relates to computer software, and more specifically, to database computer software.

BACKGROUND OF THE INVENTION

Information to be manipulated using a computer system may be stored in a database. A database is a collection of information and may be arranged with certain data grouped into one or more records. For example, an employee database may contain the name, manager's name and salary of each employee in a company. This information may be arranged in a database using a separate record for each employee, with each record capable of storing a name, manager's name and salary. The information for each employee may be entered into the records to build a table, and one or more tables is used to build a database. As new employees join the company and old employees depart the company, the database may be changed by one or more users to maintain the information stored in the database. Conventional database programs such as Access, commercially available from Microsoft Corporation of Redmond, Wash., Lotus Approach, commercially available from IBM Corporation of Armonk, N.Y., and Filemaker, commercially available from Claris Corporation of Cupertino, Calif. may be used to implement databases, the Oracle 7 product commercially available from Oracle Corporation of Redwood Shores, Calif. may be purchased to implement a client-server database, or a database may be programmed using conventional programming languages such as C, Pascal or Basic and conventional database programming techniques.

Some databases are maintained in such a manner that all data in the database is current. For example, when an employee leaves the employ of the company, the record corresponding to the employee may be deleted from the database. Referring now to FIG. 1A, a table 100 in a database that contains the name 120, salary 122 and manager 124 of each employee in a company is shown. There are two rows 110, 112, one for each employee in the company. Each row 110, 112 corresponds to a record in the table 100 and the table 100 is the database.

Information is retrieved from a database using a form of retrieve command. In many conventional databases products, the retrieve command is implemented in a structured format known as a query. Queries that comply with a set of standards are referred to as "SQL queries". Other conventional databases use other types of commands, such as a "find," and still others use both the find and query approaches. As used herein, "query" includes queries, finds or other requests for data made to a server. To identify the number of employees of the company, a query may be made to identify and count the employees in the table 100. Conventional query or find commands allow a novice user to quickly locate and summarize data without substantial training.

For example, to identify the managers who made less than all of their employees, an SQL query could be applied to the employee table 100 as follows:

```
SELECT Name
FROM Employee E1
WHERE NOT EXISTS (SELECT *
    FROM Employee E2
    WHERE E1.Name = E2.Manager AND E1.Salary >=
E2.Salary)
    AND EXISTS (SELECT *
        FROM Employee E3
        WHERE E1.Name = E3.Manager AND E1.Salary <
E3.Salary)                                          (Query 1)
```

The result of this query will be a list of managers names corresponding to managers who make less than all of their employees.

It is often desirable to maintain information that is not current in a database. For example for tax purposes, additional fields may be added to each record in the database to allow information that is not current to nevertheless be maintained. For example, a "StartDate" field and an "Stop-Date" field could be added to each employee record to indicate the dates during which an employee had a specified salary and manager. Referring now to FIG. 1B, the employee table 100 of FIG. 1A can be modified as table 150 to capture historical data by adding the StartDate and StopDate columns 126, 128 to indicate a period during which the data in the row 160, 162, 164, 166 is or was valid. Table 150 contains all the values of the data in the database, not just the current values. Thus, table 150 contains different values of the data in the database over time. It is possible for the StartDate and StopDate columns 126, 128 to contain dates in the future, for example to store planning data in the table 150.

It may be desirable to identify any manager that made less than all of the manager's employees during any period of time, and to also identify the period of time in which this situation was valid. One method of identifying this information would be to select data from the table 150 that has a StartDate and a StopDate that contains a specified day, then test the condition using the query above, and repeat this process for every day during which data in the table 150 is valid. Such a process would require numerous queries to the database, using processing resources that might be expended performing other tasks. It is desirable to identify a way of obtaining information from a database that accommodates different values of the data according to a variable such as time, while minimizing the number of queries made to the database and is independent of the precision (e.g. day, second, microsecond) of the variable.

SUMMARY OF INVENTION

A method and apparatus produces a query from an original query provided by a user, and which logically divides the range of the variable covered by the database into multiple segments, each segment corresponding to a range over which the other data in the tables used to produce the results of the query is constant. The records in each table corresponding to some or all of each range are joined as a set and the query is applied to each joined set for each of the segments. The present invention allows these actions to be performed with as few as one query, reducing the number of queries that may otherwise be required to produce this information.

BRIEF DESCRIPTION OF THE DRAWINGS

FIG. 1A is a table representing the contents of a conventional database table showing the name, salary and manager of each of two employees in a company.

FIG. 1B is a table representing the contents of a conventional database table showing the name, salary and manager of each of two employees in a company during four different periods, and a start and end point for each of the periods.

DETAILED DESCRIPTION OF A PREFERRED EMBODIMENT

1. Platform

Figure 2:
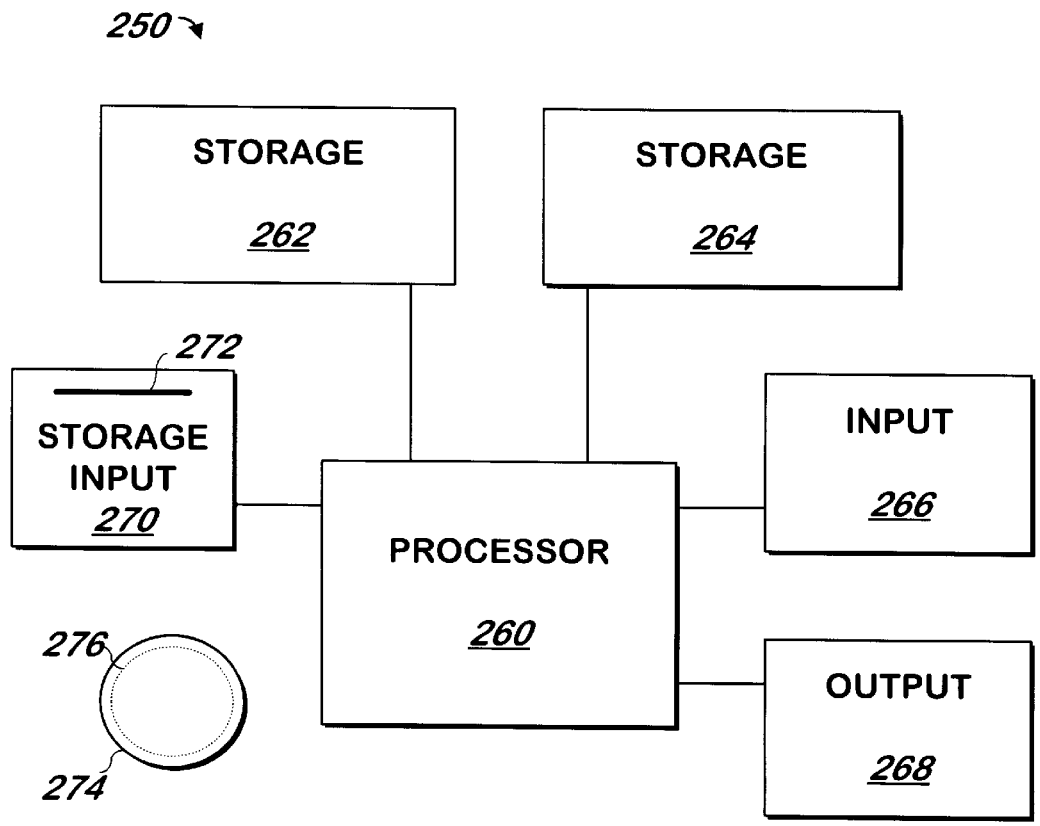
FIG. 2 is a block schematic diagram of a conventional computer system.

The present invention may be implemented as computer software on a conventional computer system. Referring now to FIG. 2, a conventional computer system 250 for practicing the present invention is shown. Processor 260 retrieves and executes software instructions stored in storage 262 such as memory which may be Random Access Memory (RAM) and may control other components to perform the present invention. Storage 262 may be used to store program instructions or data or both. Storage 264, such as a computer disk drive or other nonvolatile storage, may provide storage of data or program instructions. In one embodiment, storage 264 provides longer term storage of instructions and data, with storage 262 providing storage for data or instructions that may only be required for a shorter time than that of storage 264. Input device 266 such as a computer keyboard or mouse or both allows user input to the system 250. Output 268, such as a display or printer, allows the system to provide information such as instructions, data or other information to the user of the system 250. Storage input device 270 such as a conventional floppy disk drive or CD-ROM drive accepts via input 272 computer program products 274 such as a conventional floppy disk or CD-ROM or other nonvolatile storage media that may be used to transport computer instructions or data to the system 250. Computer program product 274 has encoded thereon computer readable program code devices 276, such as magnetic charges in the case of a floppy disk or optical encodings in the case of a CD-ROM which are encoded as program instructions, data or both to configure the computer system 250 to operate as described below.

In one embodiment, each computer system 250 is a conventional IBM compatible computer running the Microsoft Windows 95 operating system, although other systems may be used.

2. Certain Definitions

As used herein, a column may be a field, for example a field of a record or an object, or may be all the fields in a table. A record may be any collection of data, including an object.

The present invention applies to any data stored in multiple records in which it is possible that one or more of the data in two or more records varies according to a range of values of a variable, and/or other differences in the data. The data may be stored in one or more tables of a database, one or more objects of an object-oriented database, or any other storage arrangement. The range of values of the variable has an ascertainable start point and an end point. Either or both of these points may be provided as a field in the table, or they may be inferred. For example, in the table 150 of FIG. 1B, the salary data in rows 160, and 162 varies according to a range of a date variable, defined by the start point, StartDate 126 and end point, StopDate 128. The range of values can also be represented using a single point and a range, for example, a start date and a number of days, end date and a number of days or a middle date and a number of days could have been used in FIG. 1B. Any data that either describes, or allows the calculation of the start and end points of the variable, is referred to as start and end point data.

The variable in table 1B is time, measured in days. Such a database that tracks the change in information over a range of time values is referred to as a temporal database, and the tables that make up the database and that contain the start and end points of the variable are referred to as temporal tables. Other databases may use other variables to identify a range of values such as a temperature-variant database that might be used to track properties of materials over different ranges of values of temperatures. Although time, days and dates are used for purpose of example, the present invention applies to any other range of values of a variable, and the term "temporal database" and "temporal table" is hereby expanded to include tables and databases using all other types of variables as well.

A query that, when executed, provides requested information over some or all of an entire range of values of a time variable stored in a database is known as a "sequenced query." As used herein, "sequenced query" is expanded to include other types of variables as well as time variables.

3. Apparatus

Figure 3:
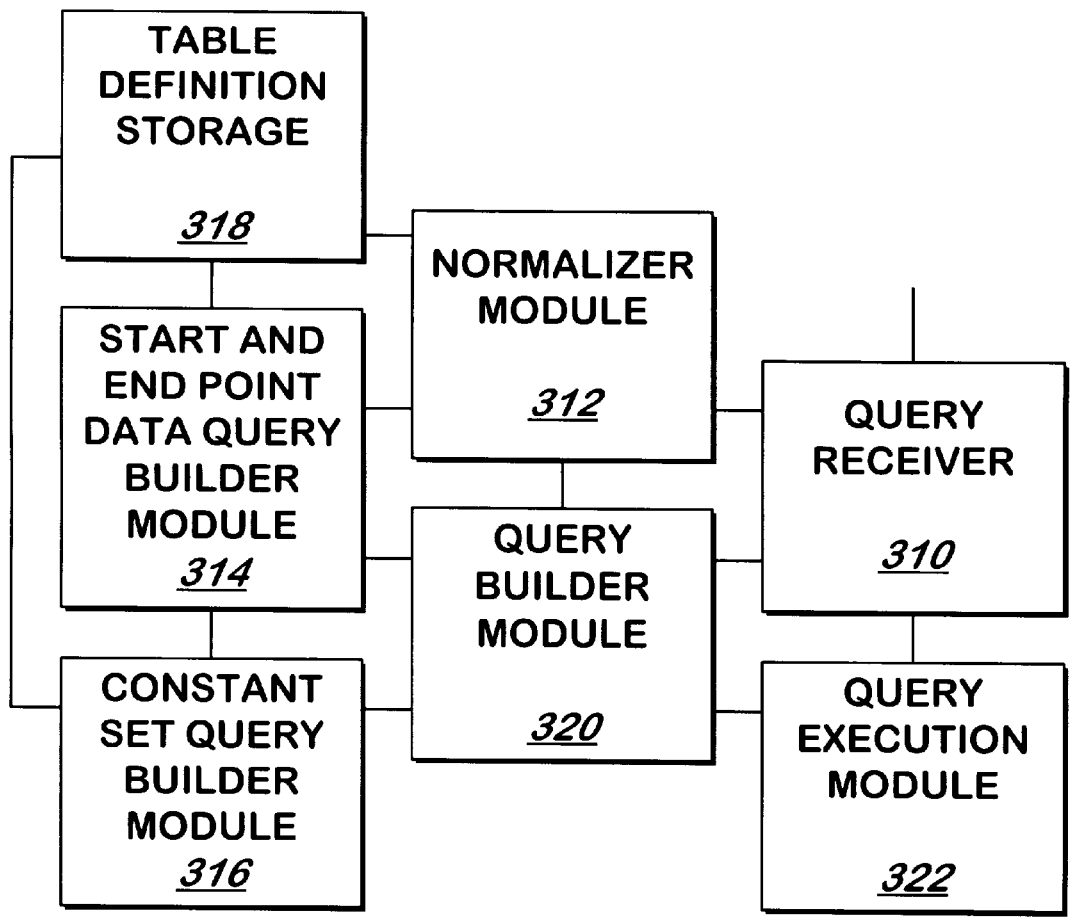
FIG. 3 is a block schematic diagram of an apparatus that can convert a query into a sequenced query according to one embodiment of the present invention.

Referring now to FIG. 3, an apparatus which receives a query for one or more temporal databases, and modifies the query to produce a sequenced query that is executable by a conventional database program is shown. Query receiver 310 receives the query provided by the user. In one embodiment, the query receiver 310 receives all queries, those related to temporal databases and those not related to temporal databases and passes queries not related to temporal databases to query execution module 320 for processing in the conventional manner, and passes to normalizer module 312 queries that may be made into sequenced queries as described below.

In one embodiment, query receiver 310 can differentiate between these two types of queries by checking a definition table of the data stored in table definition storage 318 for each table referred to in the query. Table definition storage 318 is a conventional table definition storage, such as memory or disk, that a conventional database uses to store information about the data in the table. If a timestamp or date is located in any table in the query, the query may be converted to a sequenced query as described below, and query receiver 310 then passes the query to normalizer module 312. In another embodiment, query receiver 310 identifies the type of query the user requires using commands or clauses in the query it receives. For example, a conventional "SELECT" command may have a temporal counterpart "TEMPORAL SELECT" which query receiver 310 parses and identifies as requiring a sequenced query. In another embodiment, query receiver 310 identifies whether the query is related to a temporal database by looking for pairs of field names containing "start" and "stop", "start" and "length", "stop" and "length" and other similar names in table definition storage 318 for the tables described in the query.

If the query is related to temporal tables, query receiver 310 both stores and passes the query to normalizer module 312, which uses the table definitions in table definition storage 318 to check to see if the fields containing the start and end points in each of the temporal tables used in the query use a common format and measurement system. If the start and end point data in each of the tables in the query do not use a common format and measurement system, normalizer module 312 normalizes them using a common measurement system. In one embodiment, normalizer module 312 normalizes all start and end point data by converting them to use the highest precision of any start and end point used in any temporal table referred to by the query. For example, if the start and end point data in one table store date and time information as a "timestamp" (at a precision of a second), and the start and end point data in another table store date information as a "datestamp", the information in "datestamp" format is converted to timestamp format, using a time of 12:00 a.m., which is one minute before 12:01 a.m.

In one embodiment, normalizer module 312 changes the data in the table or a copy of the table so as to use a common measurement among all start and end point data. In another embodiment, normalizer module 312 adds to the original table a number of columns equal to the number of start and end point data columns in each original table, computes the normalized data, stores them in new columns, and replaces or adjusts, and instructs query receiver 310 to replace or adjust, references to the original start and end point columns to the new start and end point columns.

Start and end point data query builder module 314 builds a query that will produce a table that contains all of the start and end point data in the temporal tables that are used in the query. Start and end point data query builder module 314 receives from normalizer module 312 a description of the start and end point data in the tables described in the original query received by query receiver 310 and then builds a query that will produce all start and end point data from all of the temporal tables used in the query received by query receiver 310 into a column of a table. If the query received by query receiver 310 contains multiple tables named "Employee1" through "EmployeeN" each containing a startdate field and a stopdate field as the start and end point data, a query such as the following is built by start and end point data query builder module 314:

SELECT StartDate AS This FROM EmployeeTable1 UNION SELECT StopDate AS This FROM EmployeeTable1 UNION . . .

SELECT StartDate AS This FROM EmployeeTableN UNION SELECT StopDate AS This FROM EmployeeTableN (Query 2a)

For example, using the data in table 150 of FIG. 1 Query 2a is "SELECT StartDate AS This FROM EmployeeTable UNION SELECT StopDate AS This FROM EmployeeTable". The result of Query 2a is to create a table, referred to herein as "Ta" containing a list of all values of the start and end point data from columns 126, 128 of table 150 of FIG. 1.

In one embodiment, if the query received by query receiver 310 is limited to a range of time, for example by using a WHERE clause that references one or more start and end point data fields, start and end point data query builder module 314 can implement the limitation by removing the WHERE clause from the query if the where clause only references start and end point data, or removing the portion of the WHERE clause that contains the references to the start and end point data, identifying the limitations, StartRestriction and EndRestriction, and replacing Query 2a with the following:

```
DROP TABLE Ta;
CREATE TABLE Ta (This DATE);
INSERT INTO Ta
    SELECT StartDate FROM Employee WHERE StartDate <
StopRestriction AND StartRestriction < StopDate
    UNION
    SELECT StopDate FROM Employee WHERE StartDate <
StopRestriction AND StartRestriction < StopDate    (Query 2b)
```

Other limitations such as those embodied in WHERE clauses from the query received by query receiver 310 may be similarly implemented by start and end point data query builder module 314. For example, if the query received by query receiver 310 is "SELECT Salary FROM Employee WHERE Name='TOM'", start and end point data query builder module 314 removes the where clause from the query and builds in place of Query 2a:

```
DROP TABLE Ta;
CREATE TABLE Ta (This DATE);
INSERT INTO Ta
    SELECT StartDate FROM Employee WHERE Name = 'TOM'
    UNION
    SELECT StopDate FROM Employee WHERE Name = 'TOM'
                                                    (Query 2c)
```

Constant Set Query Builder Module 316 builds a query using table Ta that produces a two column list of start and end points, with each start and end point in a record defining a range of values of the variable during which no change occurs in the tables referenced in the query received by query receiver 310. In one embodiment, such a query is implemented as follows:

```
SELECT T1.This as StartTb, T2.This as StopTb
FROM Ta T1, Ta T2
WHERE T1.This < T2.This
AND NOT EXISTS (SELECT * FROM Ta T3
    WHERE T1.This < T3.This and T3.This < T2.This)
                                                    (Query 3)
```

The query built by start and end point data query builder module 314 and the query built by constant set query builder module 316 can be combined into a single query prior to execution in order to reduce the number of queries made to the data server. Several ways of combining the two queries are possible. In one embodiment, Start and end point data query builder module 314 passes the text of the query it builds described above with reference to Query 2a to Constant Set Query Builder Module 316. Constant Set Query Builder Module 316 receives the text of the query it receives from start and end point data query builder module 314 and surrounds the received query with parentheses and inserts this parenthetical query in place of Ta in the query it builds. Constant set query builder module 316 provides the resulting query to Query Builder Module 320.

In another embodiment, start and end point data query builder module 314 passes the query it builds described above with reference to Query 2a to Query Builder Module 320 and Constant Set Query Builder Module 316 passes to query builder module 320 the query it builds similar to Query 3 and query builder module adds the parentheses and makes the insertion in place of Ta as described above.

When the query produced by start and end point data query builder module 314 is inserted into the query produced by constant set query builder module 316 as described above, the result of the query, if executed by query execution module 322 would be a table of start and stop timestamps, with each row in the table defining one period during which the data in all of the tables used in the query received by query receiver 310 remains constant, a table referred to as the "constant set". Query builder module 320 can have the query executed in order to produce the constant set, and then use the result to form another query that uses the constant set to produce the sequenced query, or query builder module 320 can insert the text of the query that will result in the constant set into a modified version of the query received by query receiver 310 to perform the same function using a single query.

In one embodiment, query builder module 320 directs query execution module 322 to execute the resulting query produced by inserting the query produced by start and end point data query builder module 314 into the query produced by constant set query builder module 316 and query execution module 322 produces a constant set. Query builder module 320 can direct query execution module 322 to store the resulting constant set in memory or on disk.

Query builder module 320 uses the constant set and the query received by query receiver 310 to produce a sequenced query by appending to the end of the first "SELECT" statement in the query stored by query receiver 310, ",Tb.Start, Tb.Stop" and modifying the query stored by query receiver 310 as follows: to the end of any WHERE clause at any place where a table Ti containing start and end point data is selected, inserting, "AND Ti.StartDate<Tb.Stop AND Tb.Start<Ti.StopDate"; and to a selection of any table Ti containing start and end point data for which no WHERE clause exists, inserting after the selection the clause, "WHERE Ti.StartDate<Tb.Stop AND Tb.Start<Ti.StopDate", where Tb is the name of the constant set. The resulting query is then passed to query execution module 322 for execution, and the result is a table with each row containing the sequenced query version of the result requested by the query received by query receiver 310 as well as the applicable start and end points. This result will relate data corresponding to overlapping periods of the variable. For example, the query received by query receiver 310 that requests which managers made less than all their employees produces a result that identifies the managers that made less than all their employees for a time, along with the time that situation held.

Instead of executing two queries as described above, in another embodiment, a single query is built by query builder module 320 for execution by query execution module 322 that produces the same result as described above. Query builder module 320 takes the query stored by query receiver 310 and the query or queries received from constant set query builder module 316 and start and end point data query builder module 314 and merges the queries as follows to produce a query that can be executed by conventional query execution module 322:

To the target list of the select statement in the query stored by query receiver 310 is added ",Tb.Start, Tb.Stop". To the first FROM statement in the query stored by query receiver 310 is added the query produced by Constant Set Query Builder Module 316 merged as described above with the query produced by start and end point data query builder module 314. In addition, to the end of any WHERE clause for the selection of a table Ti containing start and end point data is added, "AND Ti.StartDate<Tb.Stop AND Tb.Start<Ti.StopDate"; alternatively, for a selection of any table Ti containing start and end point data for which no WHERE clause exists, a clause is added, "WHERE Ti.StartDate<Tb.Stop AND Tb.Start<Ti.StopDate". For example, Query 1 is merged with Query 2a and Query 3 to produce the following query:

```
SELECT Name, StartTb, StopTb
FROM E1,
SELECT T1.This AS StartTb, T2.This AS StopTb
FROM (SELECT StartDate AS This
    FROM Employee
    UNION
    SELECT StopDate AS This
    FROM Employee) T1,
    T1 T2
        WHERE T1.This < T2.This
        AND NOT EXISTS (SELECT *
        FROM T1 T3
        WHERE T1.This < T3.This and T3.This < T2.This))
Tb
WHERE NOT EXISTS (SELECT *
        FROM Employee E2
        WHERE E1.Name = E2.Manager AND E1.Salary >= E2.Salary
        AND E2.StartDate < StopTb AND StartTb < E2.StopDate)
AND EXISTS (SELECT *
        FROM Employee E3
        WHERE E1.Name = E3.Manager AND E1.Salary < E3 Salary
        AND E3.StartDate < StopTb AND StartTb < E3.StopDate)
AND E1.StartDate < StopTb AND StartTb < E1.StopDate;
                                            (Query 4)
```

Query builder module 320 verifies that the query stored by query receiver 310 does not contain a table that is named, either originally or by alias techniques, Tb, and if so, selects and uses a different name for Tb as described above.

The query is submitted by query builder module 320 to query execution module 322 that is found in conventional server software which executes the query using conventional query execution techniques and returns the results of the query to the user. In one embodiment, the query results are returned via an output device such as a computer display or a printer coupled to query execution module 322 via query receiver 310.

4. Special Cases of Query Execution Module

The present invention may be adapted for use with a wide variety of query execution modules 322. Because each query execution module 322 may have particular limitations which can limit the use of the embodiments described above, other embodiments of the present invention may be used to overcome these limitations.

4a. No Select Statement in a From Clause

In one embodiment, query execution module 322 does not permit a SELECT statement in a FROM clause. In such embodiment, INSERT statements can be used to insert the values of the start and end point data into a single table. In such embodiment, start and end point data query builder module 314 builds a list of the start and end point data using the following query in place of Query 2a:

```
CREATE TABLE Ta (This DATE);
INSERT INTO Ta
    SELECT StartDate FROM EmployeeTable1
    UNION
    SELECT StopDate FROM EmployeeTable1
    .
    .
    .
    SELECT StartDate FROM EmployeeTableN
```

-continued

```
    UNION
    SELECT StopDate FROM EmployeeTableN (Query 5)
```

Constant set query builder module 316 builds a query defining the table defining the constant set using the following in place of query 3:

```
CREATE TABLE Tb (StartDate DATE, StopDate DATE);
INSERT INTO Tb
    SELECT T1.This, T2.This
    FROM Ta T1, T1 T2
    WHERE T1.This < T2.This
    AND NOT EXISTS (SELECT * FROM Ta T3
        WHERE T1.This < T3.This and T3.This < T2.This);
                                              (Query 6)
```

To the query built by constant set query builder module 316 described above, constant set query builder module 316 appends in the query stored by query receiver 310 to the end of any WHERE clause at any place where a temporal table Ti is selected, "AND Ti.StartDate<Tb.Stop AND Tb.Start<Ti.StopDate", and if no where clause exists for a selection of any temporal table Ti, inserts a where clause, "WHERE Ti.StartDate<Tb.Stop AND Tb.Start<Ti.StopDate". The fields, "StopDate" and "Start-Date" may be replaced with the equivalent named fields in the table Ti. If these fields are timestamps instead of dates, the fields, "This" in tables Ta and Ta2 and the fields "Start" and "Stop" in table Ta2 in Query 6 are defined as timestamps of the same precision instead of dates.

In one embodiment, query execution module 322 cannot process the FROM clause of Query 6 because it is not designed to allow the correlation name T1 to be reused as T2. In such embodiment, constant set query builder module 316 substitutes for the first FROM clause of Query 6 the following:

"FROM Ta T1, Ta T2"

4b. Databases That Use a Cursor

In one embodiment, query execution module 322 makes use of a cursor, such as the cursor found in the Oracle7 product commercially available from Oracle Corporation of Redwood Shores, Calif. Constant set query builder builds a cursor as follows:

```
DECLARE
    CURSOR curTb IS SELECT This FROM Ta ORDER BY This;
    StartTb DATE;
    StopTb DATE;
BEGIN
    OPEN curTb;
    FETCH curTb INTO StartTb;
    IF curTb%Found THEN
        FETCH curTb INTO StopTb;
        WHILE curTb%Found LOOP
            INSERT INTO Tb VALUES (StartTb, StopTb);
            StartTb := StopTb;
            FETCH curTb INTO StopTb;
        END LOOP;
        END IF;
END;
```

5. Special Cases of Start and End Point Data

Start and end point data may be defined in the table definition storage, or may be defined in the query or inferred as described above. The descriptions above assume that the start and end point data both exist in the tables, with end point data normalized one unit past the actual end point measurement. For example, an end point of Jan. 13, 1996 would mean the data was valid until the end of the day Jan. 12, 1996. If these assumptions are not correct, for example if the start and end point data is a start point and a length, the following embodiments of the present invention may be employed.

5a. End Point Data Not Describing One Unit After the Period

In one embodiment, if normalizer module 312 identifies that end point fields such as StopDate describe the end of a period, rather than a unit of measurement such as one day following the end of the period, normalizer module 312 signals start and end point data query builder module 314 which replaces all instances of the field with a field that adds a unit to the original value of the field. This causes end point data in one record that comes immediately before start point data in a different record to have the same value as the start point data. For example, if "StopDate" is such a field, start and end point data query builder module 314 will replace instances of "StopDate" for the table with "StopDate+ (INTERVAL '1' Day) in queries it builds described above with reference to queries 2a, 2b, 2c and 5.

5b. Starting Point and a Length

If any tables in the query received by query receiver 310 use a starting point and a length instead of a starting point and a stopping point such as StartDate and StopDate, normalizer module 312 signals start and end point data query builder module 314 to build the end point. In one embodiment, the query itself informs normalizer module 312 that such a situation exists using the clause "USING START StartDate AND INTERVAL Length". Query builder module 320 does not include this clause in the query that it builds. Start and end point data query builder module 314 uses "StartDate+Length" in place of "StopDate" as described above for those tables so indicated. Normalizer module 312 signals query builder module 320 with the field and table names of the start dates and intervals, and query builder module 320 replaces "Ti.StopDate" in the query stored in query receiver 310 for tables Ti so indicated with "Ti.Start+Ti.Length".

5c. SQL Periods

In one embodiment, instead of being defined by a starting point and a stopping point, a period over which the data in a record is valid is represented in the table as an SQL Period. SQL Periods are discussed in "SQL/Temporal" ISO/EIC JTC 1/SC 21/WG 3 DBL-MCI-0012, (J. Melton, Editor, July 1996). In such embodiment, start and end point data query builder module 314, replaces "StartDate" with "BEGIN (When)" and "StopDate" with "End(When)" in the query it builds as described above. The first line of the query built by constant set query builder module 316 is replaced with "SELECT PERIOD(T1.This, T2.This) AS When". Query builder module 320 appends Tb.When to the first select clause, and adds to the end of any WHERE clause corresponding to the selection of a temporal table Ti that uses an SQL period, "AND Ti.When OVERLAPS Tb.When"; and for a selection of table Ti containing start and end point data in which no WHERE clause is used, inserts a where clause "WHERE Ti.When OVERLAPS Tb.When" in the query it builds as described above.

Figure 4:
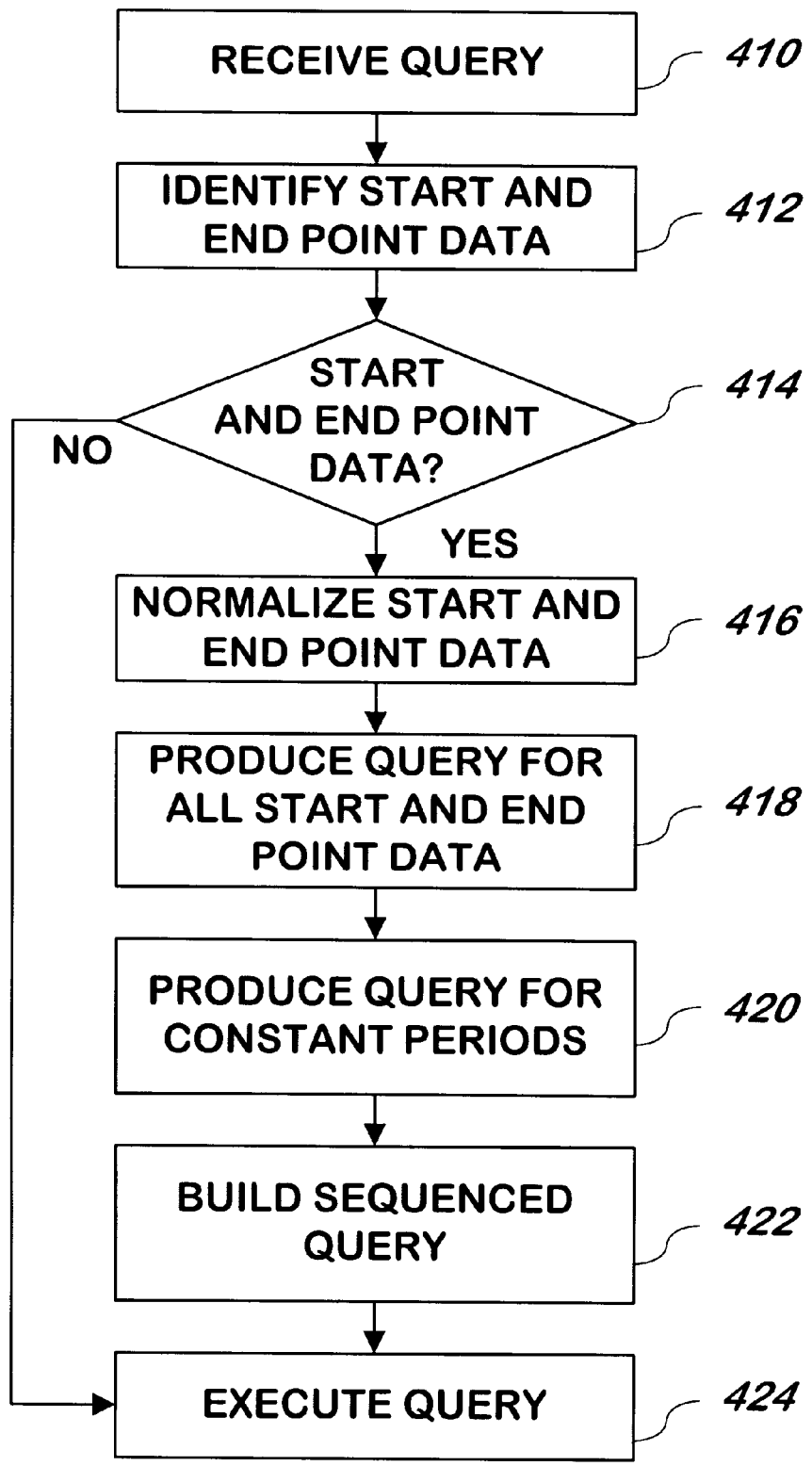
FIG. 4 is a flowchart illustrating a method of converting a query into a sequenced query according to one embodiment of the present invention.

Referring now to FIG. 4, a method of building and executing a sequenced query is shown. The query desired by the user is received 410 and the presence of, and other information about, such as the name of the database and fields that contain start and end point data are identified as described above 412. In one embodiment, this information is obtained as described above, such as using the definitions of the data in the table, or by looking for timestamp data. In another embodiment, the query identifies the start and end point data using a syntax such as "DATENAMES STARTPOINT <fieldname> AND ENDPOINT <fieldname> . . . " after the table name in the "FROM" clause. If none of the data is start and end point data 414, the query is executed 424 as it is received in step 410. If the data contains start and end point data, the method continues at step 416. If the data is not in a uniform format, the data is normalized as described above. For example, if some start and end point data is measured in degrees Celsius, and other data is measured in degrees Kelvin, the data is normalized to a single system of measurement. A query is built as described above 418 that is capable of producing all of the start and end point data in the tables referred to in the query received in step 410. A query is built 420 as described above that is capable of producing a table containing the constant set. The constant set can be made from the result of the query built in step 418 by eliminating all of the duplicate entries in the result and using the lowest value timestamp as the first column of the first row, and the highest value timestamp as the second column of the last row, and then starting with the first row, making the second lowest value timestamp as the second column of the first row and the first column of the second row, the next highest value timestamp as the second column of the second row and the first column of the third row, and so on until the second highest value timestamp is reached.

A sequenced query is built 422 using the query received in step 410, modified to include the query built using step 420 as described above or to use the table result of the query built using step 420 after its execution as described above. The sequenced query may be executed 424 using conventional query execution techniques as described above.

The method of the present invention may be adapted to suit any query execution limitations or different values or formats of start and end point data as described above.

What is claimed is:

1. An apparatus for producing at least one sequenced query comprising:
    a query receiver having an input for receiving and storing a first query describing at least one set of a plurality of data comprising a plurality of start and end point data and comprising other data and having an output for providing the first query;
    a constant set query builder module having a first input coupled to the query receiver output for building and providing at an output at least one second query capable of producing a result defining a set of a plurality of beginning and end point pairs, each said pair defining a constant range of at least a part of the other data in the at least one set of a plurality of data described in the first query received by at the constant set query builder first input; and
    a query builder module having a first input coupled to the query receiver output and a second input coupled to the constant set query builder module output for building and providing at an output the at least one sequenced query responsive to the first query received by the query receiver and the second query built by the constant set query builder module.

2. The apparatus of claim 1 additionally comprising a start and end point data query builder module having a first input coupled to the query receiver output, the start and end point data query builder for building and providing at an output at least one third query capable of producing a result comprising at least a plurality of the start and end point data in the at least one set of the plurality of data described in the first query received by the query receiver.

3. The apparatus of claim 2 wherein the constant set query builder additionally comprises a second input coupled to the start and end point data builder output and builds the second query responsive to the third query built by the start and end point data query builder.

4. The apparatus of claim 3 wherein the constant set query builder builds the second query comprising the third query built by the start and end point data query builder.

5. The apparatus of claim 2 wherein:
    the start and end point data query builder module builds the third query comprising a command to select at least a plurality of the start and end point data; and
    the constant set query builder module builds the second query comprising a command to select less than all of the at least the plurality selected from the start and end point data described by the command built by the start and end point data query builder.

6. The apparatus of claim 5 wherein the start and end point data query builder module builds the third query comprising a command to calculate from the start and end point data at least one data selected from a start point and an end point implied by the start and end point data.

7. The apparatus of claim 5 wherein the start and end point data query builder builds the third query comprising a command to add a unit to at least one of an end points comprising at least a portion of the start and end point data in the at least one set of the plurality of data described in the first query stored by the query receiver.

8. The apparatus of claim 5 wherein the first, second and third queries comprise text, and the query builder module builds a query comprising:
    the text of the first query;
    the text of the second query; and
    the text of the third query.

9. The apparatus of claim 1 additionally comprising a normalizer module having an input coupled to the query receiver output and an output coupled to the constant set query builder module first input, the normalizer module for modifying at least a portion of the start and end point data in at least one of the at least one set of the plurality of data described in the first query received by the query receiver.

10. The apparatus of claim 9 wherein the normalizer module modifies at least a portion of the start and end point data in at least one of the at least one set of the plurality of data described in the first query received by the query receiver to cause said start and end point data to conform to a measurement of a remainder of the start and end point data in the at least one set of the plurality of data described in the first query received by the query receiver.

11. A method of building a sequenced query, comprising:
    receiving a first query describing at least one set of a plurality of data comprising start and end point data and comprising other data;
    storing the query received;
    building a second query capable of producing a result defining a set of a plurality of start and end point pairs, each said pair defining a constant range of at least a part of the start and end point data in the at least one set of the plurality of data described in the first query received; and
    building the sequenced query responsive to the first query received and the second query built.

12. The method of claim 11 comprising the additional step of building at least one third query capable of producing a result comprising at least a portion of the start and end point data in the at least one set of the plurality of data described in the first query received.

13. The method of claim 12 wherein building the second query comprises building the second query responsive to the third query built.

14. The method of claim 13 wherein building the second query responsive to the third query comprises building the second query comprising the third query built.

15. The method of claim 12 wherein:

the third query comprises a command to select at least a plurality of the start and end point data; and the second query comprises a command to select less than all of the at least the plurality of the start and end point data selected by the command comprising the third query.

16. The method of claim 15 wherein the third query comprises a command to calculate from the start and end point data at least one data selected from a start point and an end point implied by at least a portion of the start and end point data.

17. The method of claim 15 wherein the third query comprises a command to add a unit to at least one end points comprising at least a portion of the start and end point data in the at least one set of the plurality of data described in the first query stored.

18. The method of claim 15 wherein the first, second and third queries comprise text, and the building the sequenced query comprises assembling together:

the text of the first query;

the text of the second query; and the text of the third query.

19. The method of claim 11 comprising the additional step of modifying at least a portion of the start and end point data in at least one of the at least one set of the plurality of data described in the first query stored.

20. The method of claim 19 wherein the modifying step comprises modifying at least a portion of the start and end point data in at least one of the at least one set of the plurality of data described in the first query stored by the query receiver to cause said start and end point data to conform to a measurement of a remainder of the start and end point data in the at least one set of the plurality of data described in the first query stored.

21. A computer program product having a computer useable medium having computer readable program code embodied therein for building a sequenced query, the computer program product comprising:

computer readable program code devices configured to cause a computer to receive a first query describing at least one set of a plurality of data comprising start and end point data and comprising other data;

computer readable program code devices configured to cause a computer to store the query received;

computer readable program code devices configured to cause a computer to build a second query capable of producing a result defining a set of a plurality of start and end point pairs, each said pair defining a constant range of at least a part of the start and end point data in the at least one set of the plurality of data described in the first query received; and computer readable program code devices configured to cause a computer to build the sequenced query responsive to the first query received and the second query built.

22. The computer program product of claim 21 additionally comprising computer readable program code devices configured to cause a computer to build at least one third query capable of producing a result comprising at least a portion of the start and end point data in the at least one set of the plurality of data described in the first query received.

23. The computer program product of claim 22 wherein the computer readable program code devices configured to cause a computer to build the second query comprise computer readable program code devices configured to cause a computer to build the second query responsive to the third query built.

24. The computer program product of claim 23 wherein the computer readable program code devices configured to cause a computer to build the second query responsive to the third query comprise computer readable program code devices configured to cause a computer to build the second query comprising the third query built.

25. The computer program product of claim 22 wherein:

the third query comprises a command to select at least a plurality of the start and end point data; and the second query comprises a command to select less than all of the at least the plurality of the start and end point data selected by the command comprising the third query.

26. The computer program product of claim 25 wherein the third query comprises a command to calculate from the start and end point data at least one data selected from a start point and an end point implied by at least a portion of the start and end point data.

27. The computer program product of claim 25 wherein the third query comprises a command to add a unit to at least one end points comprising at least a portion of the start and end point data in the at least one set of the plurality of data described in the first query stored.

28. The computer program product of claim 25 wherein the first, second and third queries comprise text, and the computer readable program code devices configured to cause a computer to build the sequenced query comprises computer readable program code devices configured to cause a computer to assemble together:

the text of the first query;

the text of the second query; and the text of the third query.

29. The computer program product of claim 21 additionally comprising computer readable program code devices configured to cause a computer to modify at least a portion of the start and end point data in at least one of the at least one set of the plurality of data described in the first query stored.

30. The computer program product of claim 29 wherein the computer readable program code devices configured to cause a computer to modify at least a portion of the start and end point data in at least one of the at least one set of the plurality of data described in the first query stored comprise computer readable program code devices configured to cause a computer to modify at least a portion of the start and end point data in at least one of the at least one set of the plurality of data described in the first query stored by the query receiver to cause said start and end point data to conform to a measurement of a remainder of the start and end point data in the at least one set of the plurality of data described in the first query stored.

* * * * *